United States Patent
Berning et al.

(10) Patent No.: US 8,770,386 B2
(45) Date of Patent: Jul. 8, 2014

(54) FOLDING TRANSPORT CONVEYOR FOR A CONSTRUCTION MACHINE, AUTOMOTIVE CONSTRUCTION MACHINE, AS WELL AS METHOD FOR PIVOTING A TRANSPORT CONVEYOR

(71) Applicant: Wirtgen GmbH, Windhagen (DE)

(72) Inventors: Christian Berning, Brühl (DE); Heinz Koetting, Neustadt/Wied (DE); Bjoern Schneider, Leubsdorf (DE); Herbert Ley, St. Katharinen (DE); Joerg Berges, Hennef (DE); Martin Lenz, Grossmaischeid (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 13/851,317

(22) Filed: Mar. 27, 2013

(65) Prior Publication Data

US 2013/0248329 A1 Sep. 26, 2013

Related U.S. Application Data

(62) Division of application No. 12/424,148, filed on Apr. 15, 2009, now Pat. No. 8,424,666.

(30) Foreign Application Priority Data

Apr. 29, 2008 (DE) .................. 10 2008 021 484

(51) Int. Cl.
*B65G 47/00* (2006.01)
(52) U.S. Cl.
USPC ......... 198/617; 198/313; 198/632; 198/861.2

(58) Field of Classification Search
USPC ....................... 198/617, 313, 861.2
See application file for complete search history.

(56) References Cited

U.S. PATENT DOCUMENTS

| 3,362,460 | A | * | 1/1968 | Ligh ........................... 160/188 |
| 3,799,479 | A |   | 3/1974 | Roeder et al. |
| 4,063,375 | A |   | 12/1977 | Satterwhite |
| 4,183,158 | A |   | 1/1980 | Satterwhite |
| 4,427,105 | A |   | 1/1984 | Hawley et al. |
| 4,591,432 | A |   | 5/1986 | Hartl |

(Continued)

FOREIGN PATENT DOCUMENTS

| DE | 2228395 | 12/1973 |
| DE | 203885 | 11/1983 |

(Continued)

OTHER PUBLICATIONS

Exhibit A: Search Report, European Patent Office, EP 09 15 8359, 3 pp., Aug. 27, 2009 (not prior art).

*Primary Examiner* — Joseph Dillon, Jr.
(74) *Attorney, Agent, or Firm* — Waddey & Patterson, P.C.; Lucian Wayne Beavers

(57) ABSTRACT

In a folding transport conveyor (2) for a construction machine (1), with a first transport conveyor section (4) articulated at the construction machine (1), a second transport conveyor section (6) articulated at the first transport conveyor section (4) in a pivoting fashion, with a conveyor belt (10) continuously revolving around both transport conveyor sections (6), and with at least one pivoting mechanism acting between the transport conveyor sections (4, 6), it is provided that the pivoting mechanism includes a cam mechanism (12).

13 Claims, 4 Drawing Sheets

(56) References Cited

U.S. PATENT DOCUMENTS

| | | | |
|---|---|---|---|
| 4,618,057 A | 10/1986 | Howser | |
| 4,723,867 A | 2/1988 | Wirtgen | |
| 4,753,296 A * | 6/1988 | Kruithoff | 171/26 |
| 4,756,402 A | 7/1988 | Bevins | |
| 4,775,047 A | 10/1988 | Grall | |
| 4,843,799 A | 7/1989 | Simelunas et al. | |
| 4,923,359 A | 5/1990 | Petri et al. | |
| 5,086,911 A | 2/1992 | Douglas | |
| 5,161,670 A * | 11/1992 | David | 198/588 |
| 5,299,674 A | 4/1994 | Cusitar | |
| 5,360,097 A * | 11/1994 | Hibbs | 198/313 |
| 5,443,351 A * | 8/1995 | Pettijohn | 414/523 |
| 5,460,260 A * | 10/1995 | Ochs et al. | 198/778 |
| 5,569,013 A * | 10/1996 | Evans et al. | 414/458 |
| 5,850,903 A * | 12/1998 | Walters | 198/588 |
| 5,875,883 A | 3/1999 | Ertel et al. | |
| 6,006,893 A * | 12/1999 | Gilmore et al. | 198/588 |
| 6,085,894 A * | 7/2000 | Bedford | 198/741 |
| 6,296,109 B1 | 10/2001 | Nohl | |
| 6,491,489 B1 * | 12/2002 | Stragier | 414/409 |
| 6,508,153 B1 * | 1/2003 | Lumberg et al. | 83/318 |
| 6,640,962 B2 * | 11/2003 | Richardson | 198/580 |
| 6,889,615 B2 * | 5/2005 | Johnson et al. | 104/162 |
| 6,966,418 B2 | 11/2005 | Crookston | |
| 7,153,086 B2 | 12/2006 | Kauppila et al. | |
| 7,347,311 B2 | 3/2008 | Rudge | |
| 7,472,785 B2 | 1/2009 | Albright et al. | |
| 7,784,400 B2 * | 8/2010 | Simmons | 100/87 |
| 7,802,975 B2 * | 9/2010 | Currie et al. | 425/38 |
| 2004/0118663 A1 * | 6/2004 | Gaeddert et al. | 198/861.1 |
| 2009/0158524 A1 * | 6/2009 | Patterson et al. | 5/88.1 |
| 2009/0217793 A1 * | 9/2009 | Spillner et al. | 83/289 |
| 2010/0012688 A1 * | 1/2010 | Sakane et al. | 223/37 |
| 2010/0162676 A1 * | 7/2010 | Simmons | 56/341 |
| 2010/0290879 A1 * | 11/2010 | Ricketts et al. | 414/505 |
| 2012/0285711 A1 * | 11/2012 | Sato et al. | 171/135 |
| 2013/0011230 A1 * | 1/2013 | Barry | 414/399 |

FOREIGN PATENT DOCUMENTS

| | | |
|---|---|---|
| DE | 3528038 A1 | 2/1987 |
| EP | 0731040 A1 | 9/1996 |
| EP | 1864921 A1 | 12/2007 |
| GB | 1417281 A | 12/1975 |

* cited by examiner

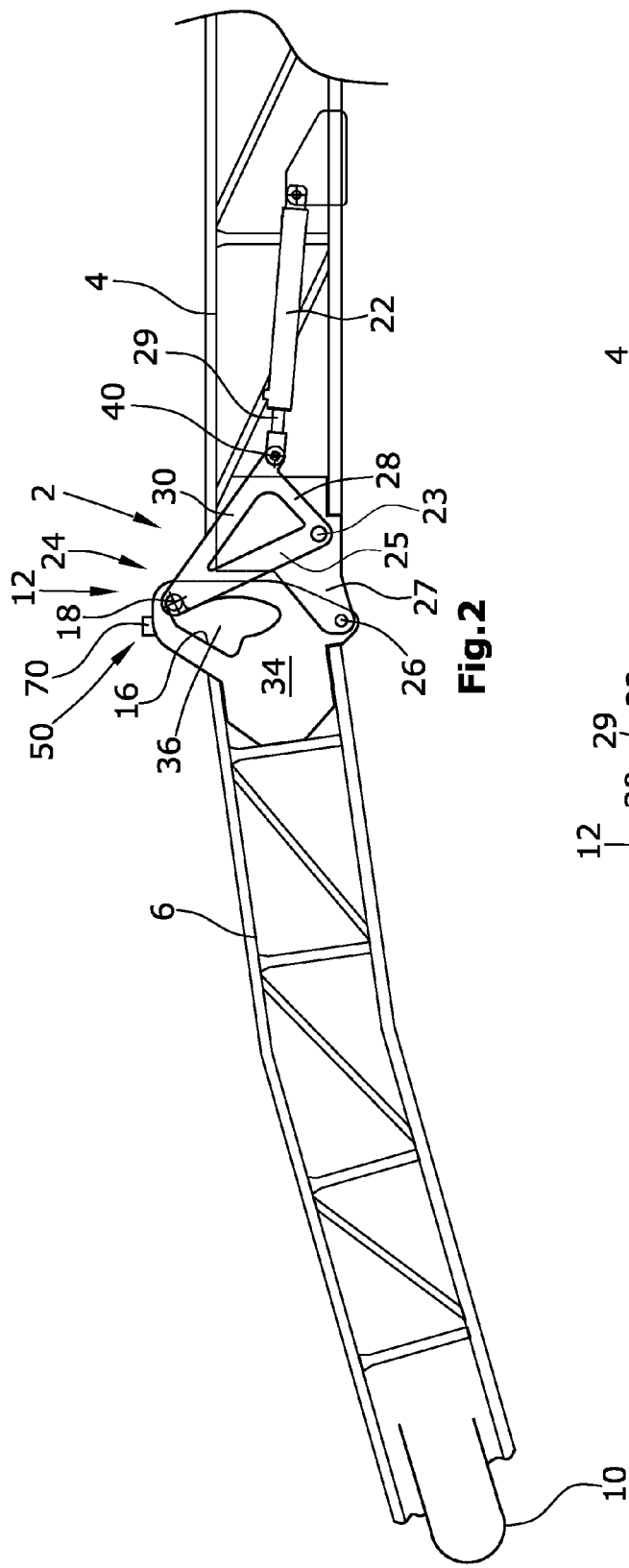
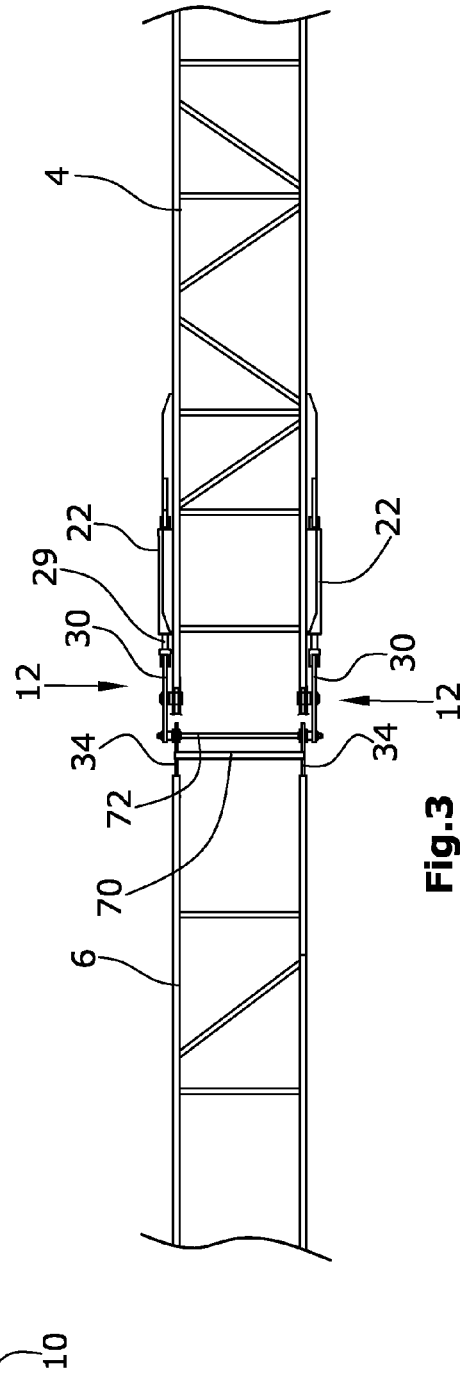
Fig. 2
Fig. 3

FOLDING TRANSPORT CONVEYOR FOR A CONSTRUCTION MACHINE, AUTOMOTIVE CONSTRUCTION MACHINE, AS WELL AS METHOD FOR PIVOTING A TRANSPORT CONVEYOR

BACKGROUND OF THE INVENTION

1. Field of the Invention

The invention relates to a folding transport conveyor for a construction machine, an automotive construction machine, as well as a method for pivoting a transport section at the end of a folding transport conveyor.

2. Description of the Prior Art

Construction machines that are provided with a transport conveyor, and in which the transport conveyor is articulated at the construction machine, can have a large space requirement in case of transport.

In order to not have to entirely remove the transport conveyor from the construction machine, it is already known to provide a folding transport conveyor which comprises a first transport conveyor section articulated at the construction machine, and a second pivotable transport conveyor section following the same. Transport conveyors of smaller size are pivoted manually. With larger transport conveyors, pivoting of the transport conveyor from a working position into a transport position is made possible by means of a pivoting mechanism acting between the transport sections. A conveyor belt continuously revolves around both transport conveyor sections.

According to the prior art, a pivoting mechanism is provided which includes a pivotable lever, wherein two piston-cylinder units engage with different places of the lever. One piston-cylinder unit each is articulated at one of the transport conveyor sections.

The prior art has the disadvantage of requiring a high apparatus-related effort as the pivotable transport conveyor section is not secured in its limit positions by the pivoting mechanism, and therefore requires locking devices in the limit positions.

In addition, a disadvantage is created by the fact that hydraulic feed lines to the pivotable transport conveyor section need to be provided which can easily be damaged when pivoting the folding transport conveyor into the transport position.

In an alternative prior art, the pivoting mechanism is characterized in that a piston-cylinder unit engages with the common point of articulation of two control arms, where that end of each of the control arms facing away from the common point of articulation is, in turn, connected to one of the transport conveyor sections in an articulated fashion.

The disadvantage created by this prior art is that the piston-cylinder unit coupled to the pivotable transport conveyor section is fastened at the underside of said transport conveyor section, which poses a great risk of the piston-cylinder unit being damaged as it is arranged underneath the transport conveyor in an exposed fashion.

In accordance with a further prior art, it is known to fold the pivotable transport conveyor section upwards, which at first glance offers the advantage of not requiring a locking device in the limit positions as the device is arrested there due to design reasons.

This design creates the disadvantage, however, that no mountings like, for instance, a suction system may be provided on the first transport conveyor section. In addition, the conveyor belt needs to be slackened when pivoting the transport conveyor into the transport position because the pivot point is then too far away from the continuously revolving transport belt.

SUMMARY OF THE INVENTION

It is the object of the invention to create a folding transport conveyor, an automotive construction machine, as well as a method for pivoting a transport conveyor section which is simplified in its design and requires no additional locking means for the transport conveyor.

According to one embodiment of the invention, it is advantageously provided that the pivoting mechanism includes a cam mechanism. Providing a cam mechanism enables the pivoting mechanism to carry out the complete pivoting operation of approximately 180° by means of one single driving device.

In addition, the cam mechanism enables detent positions to be provided in the limit positions by way of a corresponding curvature, so that the pivotable transport conveyor section can be retained in the limit positions in a self-locking fashion without requiring additional locking means.

It is preferably provided that the cam mechanism comprises a control cam which interacts with a coupling element, wherein the control cam is arranged at one of the transport conveyor sections, and the coupling element is mounted at the other transport conveyor section.

In this arrangement, the control cam may be arranged at one of the transport conveyor sections in a permanent fashion, and the coupling element may be mounted at the other transport conveyor section in a pivoting fashion.

The control cam is preferably arranged at the second transport conveyor section in a permanent fashion, and the coupling element is mounted at the first transport conveyor section in a pivoting fashion along a trajectory. In this arrangement, the trajectory may be of a circular nature, preferably a circular path.

In a preferred embodiment, it is provided that the pivoting mechanism comprises an actuating device and a pivoting lever which is actuated by the said actuating device.

The pivoting lever comprises a first lever arm and a second lever arm projecting from the first lever arm at an angle, wherein the pivoting lever, upon actuation of the actuating device, pivots the second transport conveyor section via the cam mechanism.

It is of particular advantage in this design that the drive unit can be attached to the transport conveyor section articulated at the construction machine, while the cam mechanism is arranged at the pivotable transport section in a permanent fashion. As a result, it is not necessary to transfer feed lines for the driving device to the pivotable transport conveyor section.

It is preferably provided that the pivoting lever, upon actuation of the actuating device, acts on the control cam of the cam mechanism for controlling the pivoting movement of the second transport conveyor section. Upon actuation of the actuating device, the pivoting lever can carry out the pivoting movement of the pivotable transport conveyor section completely across the overall pivoting angle provided of approximately 180°.

A preferred embodiment provides that the control cam is incorporated in a control plate. The coupling element is arranged at the free end of the pivoting lever. The pivoting lever may be mounted, with the free end of the first lever arm, at the free end of the first transport conveyor section, with the actuating device engaging at the bifurcation point between the first and the second lever arm in an articulated fashion.

The second lever arm comprises, at its free end, the coupling element that is engaged with the control cam of the cam mechanism.

The control cam comprises different cam sections wherein the control cam, in the limit positions of the pivotable second transport conveyor section, comprises detent positions in which the second transport conveyor section is retained in a self-locking fashion.

It is preferably provided that the control cam comprises a first cam section for retaining, in a self-locking fashion, the second transport conveyor section in the working position, a second cam section following the first cam section for lowering the second transport conveyor section, a third cam section following the second cam section for moving the second transport conveyor section into the transport position, and a fourth cam section following the third cam section for retaining, in a self-locking fashion, the second transport conveyor section in the transport position.

In this arrangement, it is provided that the cam sections of the control cam comprise one alignment each in the working position and transport position of the second transport conveyor section which, in combination with the coupling element of the pivoting lever, forms a detent position without locking means which can only be left again upon actuation of the actuating device.

It is preferably provided that the control cam is designed in such a manner that the forces in the piston-cylinder unit are minimized across the entire pivoting range. This can be effected by the lever arms of the pivoting lever projecting from one another at an angle of less than 90°, and/or the lever arm coupled with the second transport conveyor section being longer than the lever arm coupled with the first transport conveyor section, and is preferably more than twice as long.

The ends of the first and second lever arm facing away from the actuating device may be connected to one another wherein the pivoting lever may include a plate or of control arms connected to one another in a preferably triangular shape.

Two pivoting mechanisms arranged in pairs and operated synchronously are preferably arranged at the sides next to the transport conveyor sections. In a preferred embodiment, parts of the pivoting mechanism corresponding to one another may be connected to one another by means of bridging elements in order to improve the synchronous operation and/or to create a stiffening effect. To this end, the part pairs of the pivoting mechanisms on both sides, arranged in pairs next to one another, may be connected to one another by cross struts. In addition, the support rollers forming the coupling element may be provided with a common axle and can thus also reinforce the structure of the cam mechanism.

The method for pivoting a second transport conveyor section articulated at a first transport conveyor section is characterized by exerting an actuating force on a coupling element coupled to one transport conveyor section, or on a control cam element coupled to the other transport conveyor section, with the coupling element being engaged with the control cam element in order to create the pivoting movement of the second transport conveyor section.

In this arrangement, the control cam element or the coupling element may be attached to one of the transport conveyor sections in a permanent fashion, and the complementary element may be mounted at the other transport conveyor section in a pivoting fashion.

The element mounted in a pivoting fashion is preferably moved on a circular path.

In the following, one embodiment of the invention is explained in more detail with reference to the drawings.

BRIEF DESCRIPTION OF THE DRAWINGS

FIG. 2 is a partial side view of a folding transport conveyor shown in the side view in working position.

FIG. 3 is a schematic top view of the transport conveyor of FIG. 2 without conveyor belt.

DETAILED DESCRIPTION OF THE PREFERRED EMBODIMENT

Figure 1:
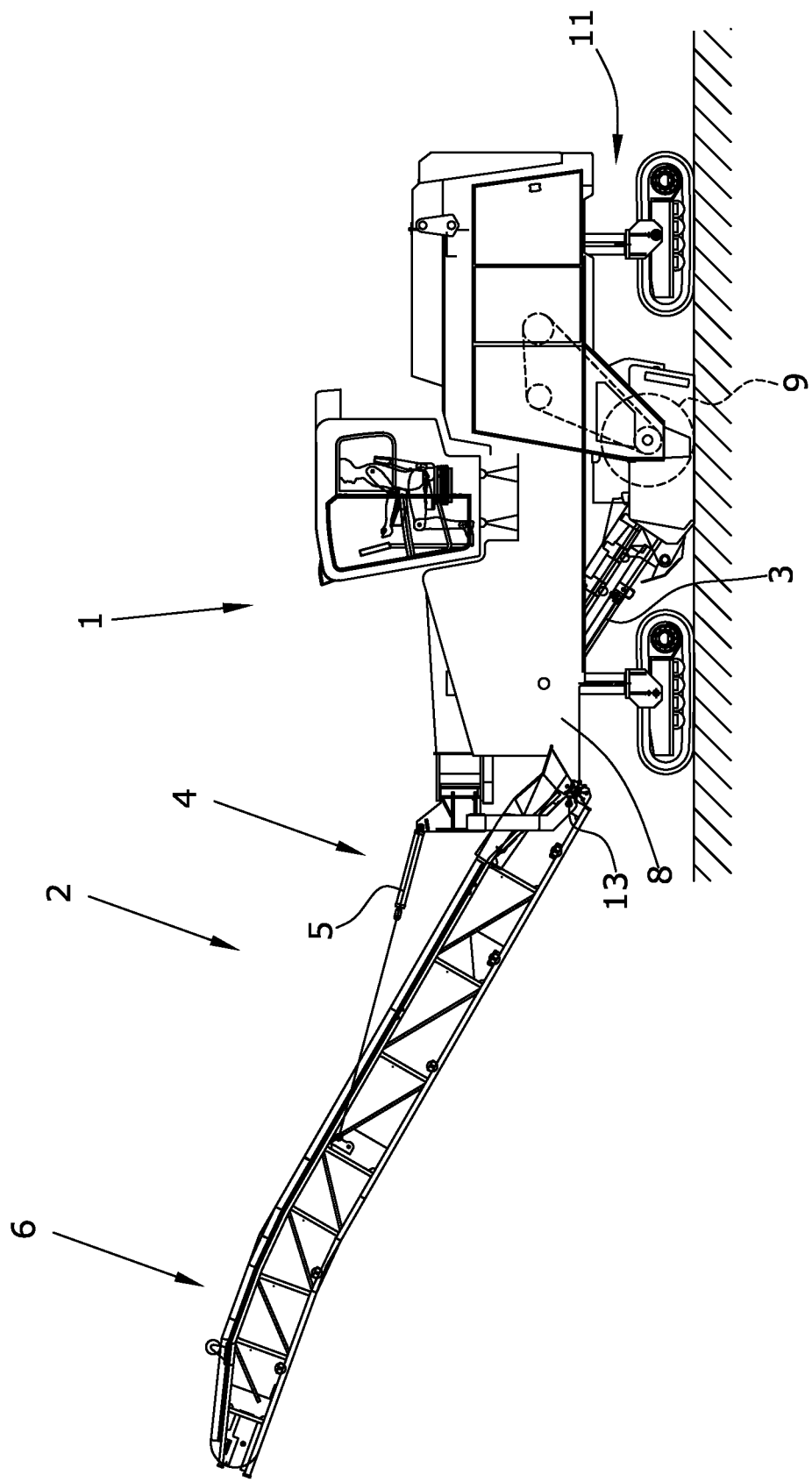
FIG. 1 is a side elevation view of a road construction machine with a transport conveyor.

FIG. 1 shows a road milling machine for milling ground surfaces or traffic surfaces in the embodiment of a front-loading road milling machine. The road milling machine 1 comprises a chassis 11 with, for example, four crawler track units, which carries the machine frame 8 of the road milling machine 1. It is understood that the crawler track units may be substituted wholly or in part by wheel units. A milling drum 9, which extends transversely to the direction of travel, is mounted in the machine frame 8. The milling depth is preferably set by means of the height adjustment of the crawler track units via lifting columns. The road milling machine 1 depicted in FIG. 1 is also called a front-loading road milling machine as it is capable of conveying the milled material towards the front when seen in the direction of travel onto a transport vehicle. A first transport device, consisting of a transport conveyor 3, is arranged in front of the milling drum 9 when seen in the direction of travel, which preferably transfers the milled material to a second transport device including a folding transport conveyor 2. It is understood that the road milling machine 1 may also be provided with one single transport conveyor 2 only which may also be arranged at the rear of the machine.

The road milling machine depicted in FIG. 1 shows a typical embodiment of a construction machine in which a folding transport conveyor can be used.

The folding transport conveyor 2 is generally also suitable for use with other construction machines in which a transport of material takes place and where there is an interest to reduce the design length of the machine for transport purposes.

The road milling machine 1 depicted in FIG. 1 is a cold milling machine which can mainly be used for the milling of road surfaces. The material worked off by a milling drum 9 is transported, via a first transport conveyor 3 existing in the machine, from a drum housing surrounding the milling drum 9 to the front end of the machine frame 8 of the machine, and there is transferred to a second transport conveyor 2 which can be folded for transport purposes in order to shorten the length of the machine 1.

Said folding transport conveyor 2 comprises a first transport conveyor section 4 articulated at the machine frame 8 of the construction machine 1 in a pivoting fashion, and a second transport conveyor section 6 articulated at the first transport conveyor section 4 in a pivoting fashion. A continuously revolving conveyor belt 10 is guided around both transport conveyor sections 4, 6. The pivotable transport conveyor 2 can be both pivoted about a ground-parallel axis 13 in order to alter the height setting of the transport conveyor 2, and slewed about a vertical axis in order to enable the material to be transported to a truck standing at the side next to the milling cut. The pivotable second transport section 6 is pivotable about a ground-parallel axis only about an articulation 26. A pulling device 5 may be used, for instance, for height adjustment, said pulling device 5 being articulated at the machine frame 8 on the one hand and being attached to the first transport conveyor section 4 on the other hand.

A pivoting mechanism is arranged between the transport conveyor sections 4, 6, which includes a cam mechanism 12.

Figure 4:
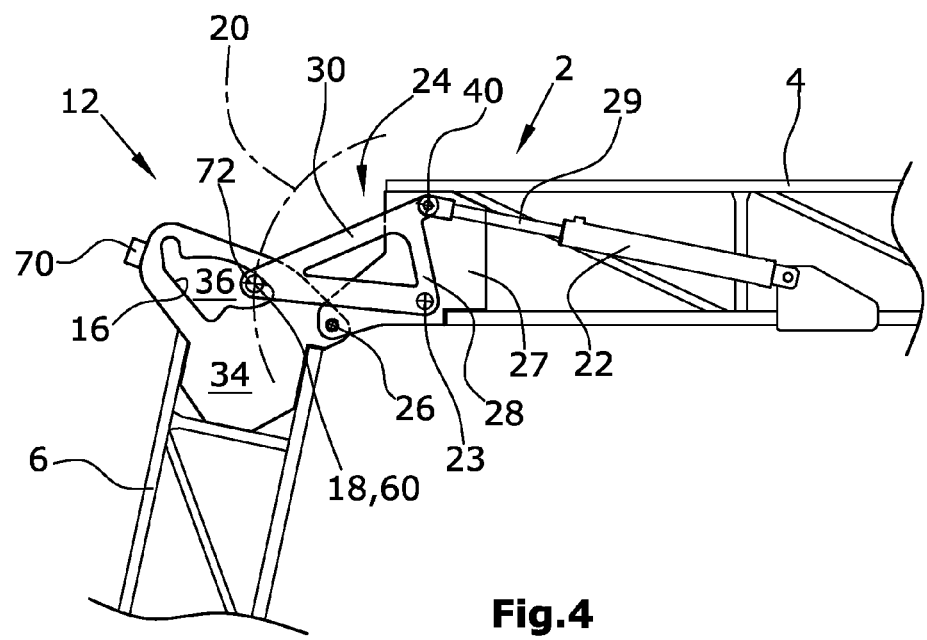
FIG. 4 is a side view of the transport conveyor of FIG. 2 with a front transport conveyor section pivoted about approximately 70°.

FIG. 2 shows the transport conveyor 2 in working position. The transport conveyor section 4 articulated at the construction machine 1 is connected to the second transport conveyor section 6 in an articulated fashion via a pivot articulation 26 with ground-parallel axis, said pivot articulation 26 being mounted in a side plate 27 of the transport conveyor section 4, so that the second transport conveyor section 6 is pivotable about said articulation 26 from the working position into the transport position, as is shown in FIG. 4.

The folding transport conveyor 2 comprises a pivoting mechanism in the form of a cam mechanism 12 which acts between the first and second transport conveyor sections 4, 6 and controls the pivoting movement about the articulation 26. For this purpose, an actuating device 22, which preferably comprises a piston-cylinder unit, is preferably arranged at the first transport conveyor section 4, the piston rod 29 of said piston-cylinder unit being coupled to a pivoting lever 24 in an articulated fashion at an articulation 40 of the pivoting lever 24.

The pivoting lever 24 comprises at least a first lever arm 28, as well as a second lever arm 30, which project from one another at a fixed angle in the manner of a two-armed lever, and preferably at an angle of somewhat less than 90°.

The first lever arm 28 is mounted at the first transport conveyor section 4, near its free end, in an articulation 23 in the side plate 27 having its axis parallel to the ground, with the other end of the first lever arm 28 being connected to the piston rod 29 of the piston-cylinder unit 22 in an articulated fashion.

The second lever arm 30 is, on the one hand, also articulated at the piston rod 29 of the piston-cylinder unit 22, and comprises a coupling element 18 at its other end which is engaged with a control cam 16 of the cam mechanism 12. During movement of the coupling element 18, the transport conveyor section 6 is pivoted by means of the control cam 16, with the control cam 16 resting against the coupling element 18 at all times.

Figure 5:
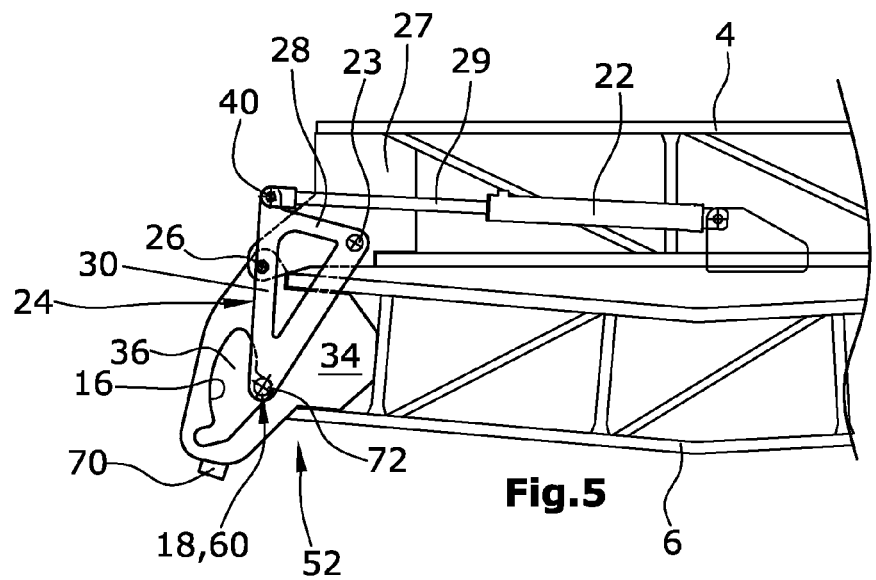
FIG. 5 is a side view of the folding transport conveyor of FIG. 2 in transport position.

For the purpose of stiffening the pivoting lever 24, the same may include a plate, or struts arranged in a triangular shape, as can be seen from FIG. 2. The coupling element 18, which includes the support roller 60 mounted in a rotating fashion, is arranged in the vertex of the acute-angled triangle formed by the struts. The support roller 60 is moved via the piston-cylinder unit 22 and the pivoting lever 24, and presses on the control cam 16 of the cam mechanism 12, by way of which a force is exerted on the second transport conveyor section 6 articulated in a pivoting fashion. When the piston rod 29 of the piston-cylinder unit 22 is moved forward, the support roller 60 leaves the detent position 50 in a first cam section 42 of the control cam 16, apparent in FIG. 6, and moves along a second cam section 44, by way of which the second transport conveyor section 6 is lowered. In the area of the third cam section 46 of the control cam 16, the second transport conveyor section 6 is pressed down below the first transport conveyor section 4, with the support roller 60, in the transport position shown in FIG. 5, being in the second detent position 52 in the fourth cam section 48 of the control cam 16.

In the respective detent positions 50 and 52, the second transport conveyor section 6 is retained in a self-locking fashion so that no additional locking means are required in order to retain the pivotable transport conveyor section 6 in its limit positions. The transport conveyor remains in the respective detent position even when the piston-cylinder unit 22 is depressurized or even removed.

As a result, the pivotable transport conveyor section 6 is capable of carrying out a pivoting movement of approx. 180° by means of the cam mechanism 12.

Figure 6:
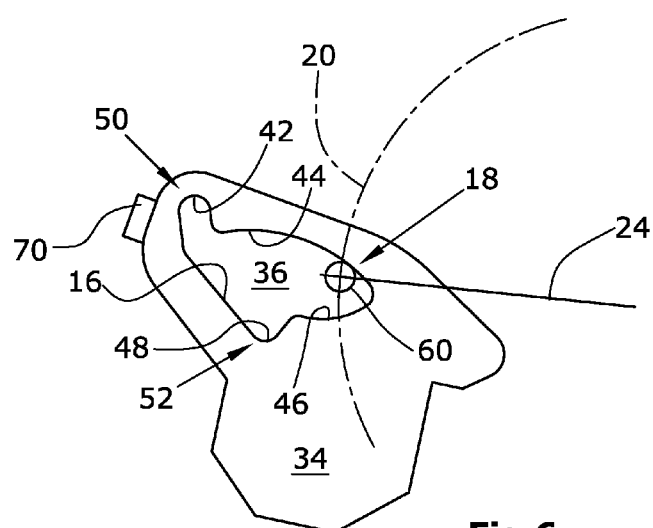
FIG. 6 shows the control plate of the cam mechanism.

In this arrangement, the support roller 60 moves around the articulation 23 on a circular trajectory 20 shown in FIG. 6. The first lever arm 28 is preferably shorter than the second lever arm 30, wherein the latter may have twice or three times the length of the first lever arm 28.

The cam mechanism 12 comprises a control plate 34 in which the control cam 16 is designed in the shape of a cut-out 36. The control plate 34 is connected to the second transport conveyor section 6 in a permanent fashion, namely preferably welded to the struts of the second transport conveyor section 6.

Figure 7:
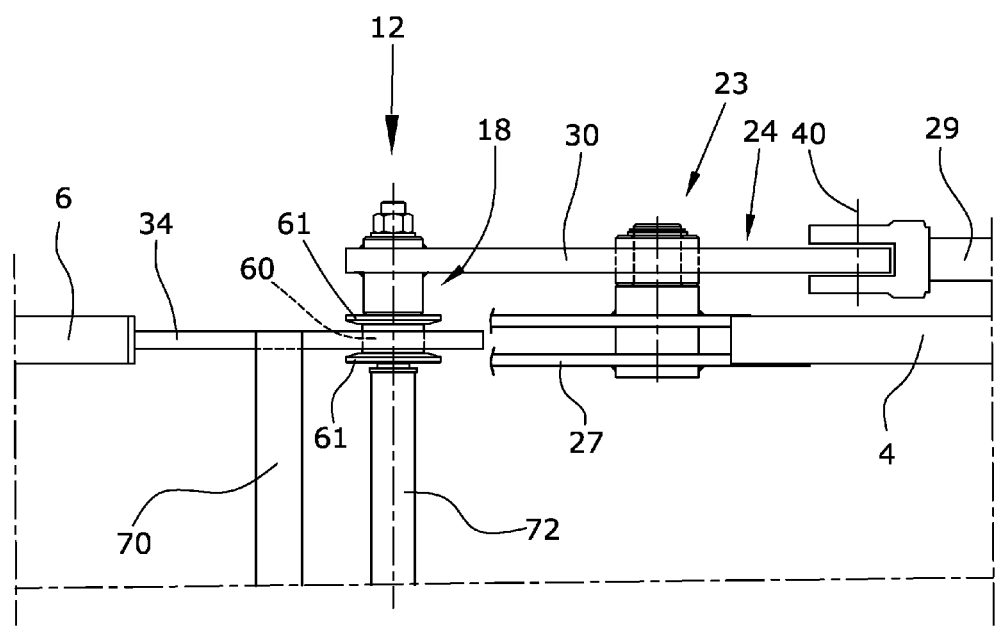
FIG. 7 is an enlarged top view of the cam mechanism of the transport conveyor of FIG. 2.

As can best be seen from FIGS. 3 and 7, preferably two cam mechanisms 12 actuated synchronously by two actuating devices 22 are arranged on both sides of the transport conveyor sections 4, 6. In this arrangement, at least one cross strut 70 represents a bridging between the control plates 34 of the left side and the right side, which creates a stiffening of the control plates 34. A comparable bridging between the coupling elements 18 of the left side and the right side is realized by an axle 72 which ensures improved synchronous operation of the two sides of the pivoting mechanisms. The axle 72 is a common axle for the support rollers 60 on both sides, while at the same time stiffening the pivoting lever arrangement on both sides. The support rollers run inside the cut-out 36 and have conical side discs 61 on both sides which prevent the support rollers 60 from slipping off the control cams.

Several cross struts 70 may be provided between the control plates 34, and the articulations 23, 26 may be arranged on a common axis of cam mechanisms 12 arranged on both sides of the transport conveyor 2.

It is understood that the mechanism arrangement of the cam mechanism 12 may also be realized in kinematic inversion. It is important, however, that one single piston-cylinder unit 22 only is required for the operation of the cam mechanism 12, and that no additional locking devices are required for the two limit positions of the pivotable transport conveyor section 6.

What is claimed is:

1. A method of articulating a folding transport conveyor, the method comprising:
    (a) providing a folding transport conveyor including first and second articulated transport conveyor sections and a continuous conveyor belt extending around both transport conveyor sections so that there is no gap between the conveyor sections, and including a coupling element connected to one of the conveyor sections and a control cam element connected to the other conveyor section, the coupling element engaging the control cam element; and
    (b) exerting an actuating force on one of the coupling element and the control cam element and thereby moving the coupling element relative to the control cam element and pivoting the second transport conveyor section relative to the first transport conveyor section from an extended position to a folded position wherein the second transport conveyor section is underneath the first transport conveyor section.

2. The method of claim 1, wherein:
one of the coupling element and the control cam element is fixedly attached to its respective conveyor section, and the other of the coupling element and the control cam element is pivotally mounted upon its respective conveyor section.

3. The method of claim 2, wherein:
in step (b) the pivotally mounted element moves in a circular path relative to its respective conveyor section.

4. The method of claim 1, wherein:
in step (b), the second transport conveyor section pivots downwardly relative to the first transport conveyor section.

5. The method of claim 4, wherein:
in step (b) the second transport conveyor section pivots approximately 180° relative to the first transport conveyor section.

6. The method of claim 1, wherein:
step (b) further comprises moving the coupling element into a detent position of the control cam element and thereby locking the second transport conveyor section in the folded position.

7. The method of claim 6, further comprising:
exerting a second actuating force on the one of the coupling element and the control cam element, and returning the second transport conveyor section from the folded position back to the extended position; and
moving the coupling element into a second detent position of the control cam element and thereby locking the second transport conveyor section in the extended position.

8. The method of claim 1, further comprising:
when the second transport conveyor section is in the extended position relative to the first transport conveyor section, carrying particulate material with the conveyor belt from the first transport conveyor section to the second transport conveyor section.

9. The method of claim 1, wherein:
step (b) further comprises moving the coupling element through one cam section to lower the second transport conveyor section relative to the first transport conveyor section, and moving the coupling element through another cam section to pivot the second transport section to a transport position.

10. The method of claim 1, wherein:
step (b) includes pivoting a lever attached to the first transport conveyor section, the lever having the coupling element thereon, and moving the coupling element along the control cam element, the control cam element being attached to the second transport conveyor section.

11. The method of claim 10, wherein:
step (b) includes moving the coupling element from a first detent portion of the control cam element, through a second cam portion to pivot the second transport conveyor section downward, then through a third cam portion to pivot the second transport conveyor section upward, and then to a locking detent portion locking the second transport conveyor section in a transport position.

12. The method of claim 1, wherein:
step (b) includes extending a hydraulic actuator and thereby pivoting the second transport conveyor section from the extended position to a transport position.

13. The method of claim 1, wherein:
step (b) includes retracting a hydraulic actuator and thereby pivoting the second transport conveyor section from a transport position to the extended position.

* * * * *